United States Patent
Choi (10) Patent No.: US 7,843,950 B2
(45) Date of Patent: Nov. 30, 2010

(54) AUDIO/VIDEO COMMUNICATIONS SYSTEM

(76) Inventor: Hyunil Choi, Unit 1110, 845 Yates St., Victoria, British Columbia (CA) V8W 4A3

( * ) Notice: Subject to any disclaimer, the term of this patent is extended or adjusted under 35 U.S.C. 154(b) by 0 days.

(21) Appl. No.: 12/733,704

(22) PCT Filed: May 8, 2009

(86) PCT No.: PCT/KR2009/002443

§ 371 (c)(1), (2), (4) Date: Mar. 16, 2010

(87) PCT Pub. No.: WO2009/142406

PCT Pub. Date: Nov. 26, 2009

(65) Prior Publication Data

US 2010/0232421 A1    Sep. 16, 2010

(30) Foreign Application Priority Data

May 19, 2008    (KR) .................... 10-2008-0046276

(51) Int. Cl.
*H04L 12/56*    (2006.01)
*H04J 1/16*    (2006.01)

(52) U.S. Cl. .................. 370/401; 370/252; 370/278; 370/352

(58) Field of Classification Search ............ 370/252, 370/278, 352–356, 400, 401
See application file for complete search history.

(56) References Cited

U.S. PATENT DOCUMENTS

| | | | |
|---|---|---|---|
| 6,385,191 B1 | 5/2002 | Coffman et al. | |
| 6,570,870 B1 | 5/2003 | Berstis | |
| 6,842,449 B2 | 1/2005 | Hardjono | |
| 6,865,266 B1 | 3/2005 | Pershan | |
| 2005/0074109 A1* | 4/2005 | Hanson et al. | 379/207.04 |
| 2005/0141691 A1 | 6/2005 | Wengrovitz | |
| 2007/0112656 A1 | 5/2007 | Howe et al. | |
| 2007/0201493 A1 | 8/2007 | Yamada et al. | |
| 2007/0206585 A1 | 9/2007 | Lee | |

FOREIGN PATENT DOCUMENTS

| | | |
|---|---|---|
| JP | 9-168051 A | 6/1997 |
| JP | 2005-184351 A | 7/2005 |
| KR | 1997-0056259 A | 7/1997 |
| KR | 1997-0056660 A | 7/1997 |
| KR | 1999-0053796 A | 7/1999 |
| KR | 2000-0001054 A | 1/2000 |

(Continued)

*Primary Examiner*—John Pezzlo
(74) *Attorney, Agent, or Firm*—The Nath Law Group; Jerald L. Meyer; Derek Richmond (57) ABSTRACT

An audio/video communication system is provided which includes: a web server providing a user system with a phone icon or button indicating a call receiver and transmitting a phone identifier LN for identifying the receiver allocated to the phone button when a user clicks the icon or button; and a gateway module performing a call setup in response to a data connection request for the audio/video communication from the user system, specifying the user identifier DN for identifying the user system from another user system, transmitting the phone identifier LN to the IP-based telephone exchanger, and relaying a communication between a phone connected to the IP-based telephone exchanger and the user system to progress the audio/video communication.

20 Claims, 3 Drawing Sheets

FOREIGN PATENT DOCUMENTS

| | | |
|---|---|---|
| KR | 2000-0030586 A | 6/2000 |
| KR | 2001-0068134 A | 7/2001 |
| KR | 2001-0100383 A | 11/2001 |
| KR | 2001-0105850 A | 11/2001 |
| KR | 2002-0003645 A | 1/2002 |
| KR | 2002-0011586 A | 2/2002 |
| KR | 2002-0031007 A | 4/2002 |
| KR | 2002-0065803 A | 8/2002 |
| KR | 2002-0079020 A | 10/2002 |
| KR | 2002-0088977 A | 11/2002 |
| KR | 2003-0008546 A | 1/2003 |
| KR | 2003-0062766 A | 7/2003 |
| KR | 2003-0085171 A | 11/2003 |
| KR | 10-2004-0017995 A | 3/2004 |
| KR | 10-2004-0051662 A | 6/2004 |
| KR | 10-2005-0052844 A | 6/2005 |
| KR | 10-2007-0105039 A | 10/2007 |

\* cited by examiner

AUDIO/VIDEO COMMUNICATIONS SYSTEM

This is a National Phase Application filed under 35 U.S.C. 371 as a national stage of International Application No. PCT/KR2009/002443, filed May 8, 2009, an application claiming foreign priority benefits under 35 U.S.C. 119 of Korean Application No. 10-2008-0046276, filed May 19, 2008, the content of each of which is hereby incorporated by reference in its entirety.

TECHNICAL FIELD

The present invention relates to an audio/video communication system, and more particularly, to an audio/video communication system for providing a gateway module that relays communications between a phone connected to an IP-based telephone exchanger and a user system, which is limited to use of Internet phones of companies having the IP-based telephone exchanger and users.

BACKGROUND ART

Communications using the Internet have been widely used all over the world, and the usage frequency and the amount of information thereof have exponentially increased. Users can transmit and receive desired information by the use of various computer devices such as personal computers and mobile devices. The OSI (Open Systems Interconnection) 7 layers established by the ISO (International Organization for Standardization) is known as a communication standard therefor.

Layer 7: Application Layer
Layer 6: Presentation Layer
Layer 5: Session Layer
Layer 4: Transport Layer
Layer 3: Network Layer
Layer 2: Data Link Layer
Layer 1: Physical Layer The TCP/IP is actually used on the basis of the OSI 7 layers. The TCP/IP generally includes four layers.

Application Layer: HTTP, FTP, TELNET, SSH, SIP which correspond to Layers 7 to 5 of the OSI Transport Layer: TCP, UDP, SCTP which correspond to Layer 4 of the OSI Internet Layer: IP which corresponds to Layer 3 of the OSI Network Access Layer: MAC which corresponds to Layers 2 and 1 of the OSI In the WWW, data is transmitted in accordance with a communication protocol called "HTTP (Hyper Text Transfer Protocol)" and information details are displayed on a screen using a file described in the hyper text markup language (HTML) or the like.

When a user calls a service provider, the user gives a call with a general phone. In this case, the user pays the cost or the user calls free with the telephone number in which the service provider pays the cost. When the user gives a call with a VoIP phone using the Internet, the opposite may be a phone connected to the Internet line or a phone connected to a general telephone line.

In the phones which are connected by an Internet service provider (ISP), services for communications of voice, video, and data (for example, "Skype" and "MSN Messenger") are widely used between VoIP soft phone users. When the user pays the cost, the services may permit a telephone call with a general telephone line. The services are provided to corporate VoIP soft phones (such as Cisco IP SoftPhone) accessing virtual Private Networks (VPNs) for use in companies. In the services provided by the Internet Service Providers, the phones can be connected on line to give a call only when they use the VoIP soft phone service of the same ISP. When even subscribers of the same VoIP soft phone service are not on line, the telephone call is not possible.

The VoIP soft phone users of the ISP connected to the Internet line communicate with each other by the use of the ISP's relay. In this case, the communications are recognized and made on the basis of the IP addresses corresponding to Layer 3 which is the network layer among the OSI 7 layers and the SIP (Session Initiation Protocol) information corresponding to Layer 5 which is the session layer. However, specifications other than the SIP may be used depending on the situations.

When a VoIP soft phone user gives a call to an opposite connected to a general telephone line, a communication based on the IP addresses is established between the VoIP soft phone user as a client and the ISP, and a communication using an existing telephone network is established between the ISP and the general phone.

On the other hand, as the primary related art, the VoIP-based SIP session protocol corresponding to Layer 5 which is the session layer among the OSI 7 layers is defined by the IETF (Internet Engineering Task Force) and becomes an international standard.

Most users want to give a call to an external phone of a service provider or an affiliate of the service provider, when the user's phone gives a call to the phone of the service provider or the affiliate with his or her charge, when the user's phone gives a call to a telephone number for which the service provider or the affiliate pays the cost, and when the user's VoIP soft phone gives a call to the general phone of the service provider or the affiliate.

DISCLOSURE OF THE INVENTION

Technical Problem

An advantage of some aspects of the invention is that it provides an audio/video communication system providing a free call between a provider with an IP-based telephone exchanger and a user. Here, some telephone fee may be charged when a phone connected to the IP-based telephone exchanger uses an external telephone network (PSTN).

Another advantage of some aspects of the invention is to establish a communication between a user's phone and a phone connected to an IP-based telephone exchanger by clicking a phone-shaped icon or an image button disposed in a web page without particularly requesting a user for log-in or information.

Solution to Problem

According to an aspect of the invention, there is provided a service provider system establishing an audio/video communication between a user system including a user agent progressing the audio/video communication and a system including an IP-based telephone exchanger taking charge of a telephone exchange between Internet phones and a plurality of phones connected to the IP-based telephone exchanger, the service provider system including: a web server providing the user system with a phone icon or button along with access information for a call and transmitting a phone identifier LN for identifying the receiver allocated to the phone button when a user clicks the icon or button; and a gateway module receiving a call setup request for the audio/video communication from the user system, transmitting the phone identifier to the IP-based telephone exchanger, and relaying a communication between a phone connected to the IP-based telephone exchanger and the user system to progress the audio/video communication.

According to another aspect of the invention, there is provided a service provider system relaying an audio/video communication between a user system including a user agent progressing the audio/video communication and a system including an IP-based telephone exchanger taking charge of a telephone exchange between Internet phones and a plurality of phones connected to the IP-based telephone exchanger, the service provider system including: a web server providing the user system with a phone icon or button along with access information for a call and transmitting a phone identifier LN allocated to the phone button and a user identifier DN for identifying the user system from another user system when a user clicks the icon or button; and a gateway module receiving a call setup request for the audio/video communication from the user system, transmitting the phone identifier to the IP-based telephone exchanger, and relaying a communication between a phone connected to the IP-based telephone exchanger and the user system to progress the audio/video communication.

Advantageous Effects

As described above, it is possible to enable a communication between a user's VoIP soft phone and a service provider's phone or an external phone by disposing a gateway module connecting the IP-based telephone exchanger and the user agent of the user system therebetween.

According to the invention, a user can make a data communication for call request with a phone connected to a desired IP-based telephone exchanger by a click on a service provider's web browser and thus the user agent can be supplied with a recognition number DN from the web server or the gateway module for the purpose of temporary use. Accordingly, the IP-based telephone exchanger interlocks with the gate module as a recognizable phone and the gateway module interlocks with the IP-based telephone exchanger, whereby a communication service between the user and the service provider or the affiliate is finally provided. By processing the user's call request using the gateway module, the user agent can be recognized as an internal phone by the IP-based telephone exchanger using the temporary identifier DN given by the user.

The Internet VoIP soft phone service such as the Skype or the MSN messenger has a technical or business closed property that only users provided with a client program of the same service provider can use the service and should pay the cost for general phones. However, according to the invention, any one using a web browser can request for a call in (by interlocking with) an opened HTTP session, the user agent associated with the communications can access the gateway module, and free service can be provided to the phones connected to the IP-based telephone exchanger, thereby enabling a real-time communication.

According to the invention, companies that can use web services and data networks, such as large enterprises and small enterprises having an IP-based telephone exchanger can allow users visiting their home pages to enjoy free communication and real-time audio/video inquiry and response using constructed infrastructures, thereby reducing costs and satisfying customers in businesses providing services such as call centers.

DESCRIPTION OF REFERENCE NUMERALS AND SIGNS

100: USER SYSTEM
200: SERVICE PROVIDER SYSTEM
300: IP-BASED TELEPHONE EXCHANGER
500: PHONE

DESCRIPTION OF EXEMPLARY EMBODIMENTS

Exemplary embodiments of the invention will be described in detail with reference to the accompanying drawings.

Figure 1:
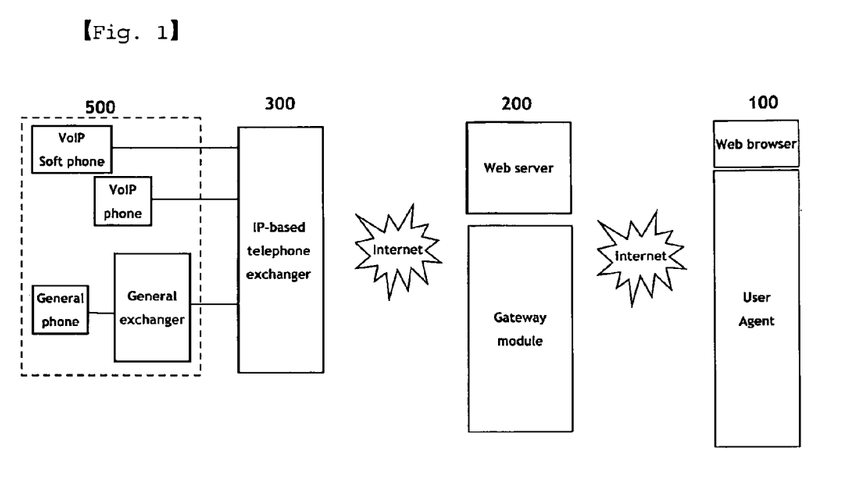
FIG. 1 is a diagram illustrating a configuration of an audio-video communication system according to an embodiment of the invention.

FIG. 1 is a diagram illustrating the configuration of an audio and video communication system according to an embodiment of the invention. The audio and video communication system according to the embodiment of the invention includes a user system 100 including a web browser analyzing and showing HTML and a user agent progressing an audio or video communication with a phone connected to an IP (Internet Protocol)-based telephone network, a service provider system 200 including a web server providing a web page including a telephone button or icon to a user and a gateway module being disposed between the user agent and an IP-based telephone exchanger, performing a call setup between the user agent and the IP-based telephone exchanger, and progressing the audio or video communication between the phone and the user agent, and an IP-based telephone exchanger 300 connecting plural phones 500 or a general telephone exchanger.

Examples of the user system 100 include a personal computer having an input and output device, a notebook computer, a mobile phone, and an electronic apparatus accessing the Internet. The user agent is a software module installed in a memory of the user system, and performs a series of processes of accessing the gateway module to initialize a call setup with access information (such as IP address) of the gateway module when a user clicks the telephone icon or button displayed in the web browser, communicating with the phone connected to the IP-based telephone exchanger, and stopping the communication. When the function of the user agent is included in the web browser of the user system 100, it is not necessary to separately install the user agent.

To transmit access information for accessing the gateway module to the user agent, (1) a method of receiving the access information such as the IP address of the gateway module from the web server when the user clicks the phone icon or button and accessing the gateway module using the received access information and (2) a method of storing the access information of the gateway module to be accessed in the user agent and accessing the gateway module when the user click the phone icon or button are can be used. The former method can be more suitably used for the general purpose. This is because it is not necessary to download the user agent even when the user intends to communicate with a phone connected to another IP-based telephone exchanger 300.

The service provider system 200 is a server system including a web server providing a web page to plural users.

The gateway module communicates with the web server and the IP-based telephone exchanger, respectively, by server to server. The gateway module communicates with the user agent and relays the communication to connect the user agent to the IP-based telephone exchanger of the service provider system 200. In general, the gateway module communicates with the user agent using a public IP, and the gateway module communicates with the IP-based telephone exchanger using a private IP or a public IP.

The user agent itself cannot communicate with the phone 500 connected directly/indirectly to the IP-based telephone exchanger. This is because the user agent does not have the phone identifier DN registered in or shared with the IP-based telephone exchanger 300 establishing the communication and cannot thus understand the existence or the access information. However, when the web server or the gateway module gives a temporary phone identifier DN which can be recognized by the IP-based telephone exchanger 300 to the user agent and requests the IP-based telephone exchanger 300 for a call, the IP-based telephone exchanger 300 recognizes the user agent as a phone directly/indirectly to the IP-based telephone exchanger and performs a communication relaying function. That is, the user agent to which the temporary phone identifier is given serves as a virtual internal phone.

The gateway module accesses the user agent of the user system 100 using the public IP address and accesses the IP-based telephone exchanger 300 by a server to server communication. The gateway module performs a function of relaying a communication between the user agent of the user system 100 and the phone 500 connected to the IP-based telephone exchanger 300.

The IP-based telephone exchanger 300 is a telephone exchanger based on the Internet protocol and performs the functions of the existing telephone exchangers on the basis of the IP (Internet Protocol). The IP-based telephone exchanger serves to manage a call process, a signaling, and a dial plan and to manage the functions provided from the phones. The IP-based telephone exchanger is generally called IP PBX.

The phone 500 is a term generally indicating phones mounted on the IP-based telephone exchanger 300 to make a communication and general phones connected by a general exchanger connected to the IP-based telephone exchanger 300. Examples of the phone 500 include a software internet phone (also referred to as "VoIP soft phone") making a communication using a head set mounted with a micro phone by installing a software module in a client computer on the basis of the IP, an Internet phone (also referred to as "VoIP phone") in which the software module is embodied in the phone by hardware or software, and general phones. The phone 500 is not particularly limited, as long as it is directly or indirectly connected to the IP-based telephone exchanger 300 via an internal or external network. As shown in FIG. 1, all the phones directly or indirectly connected to the IP-based telephone exchanger 300 are called phone 500.

In the system shown in FIG. 1, the user system 100 and the service provider system 200 are connected to each other via the Internet, and the service provider system 200 and the IP-based telephone exchanger 300 are connected to each other via the Internet.

In the invention, the audio communication or the video communication between the user agent and the phone preferably uses the SIP protocol. However, the invention is not limited to this configuration. The SIP protocol is an international standard, but it is known that the company "Skype" uses a modified protocol instead of the SIP protocol.

The service provider system 200 may further include a gateway module interlocking with the web server via the Internet and may further include a particularly download server for downloading and installing the user agent into the user system 100. In this case, the user agent of the user system 100 may be download and installed like an active X, may be transmitted and installed in the form of an attached file of a mail, may be directly downloaded, or may operate by providing the function in the web browser.

The audio communication in the invention means an audio communication based on data communication and is generally called VoIP communication.

Figure 2:
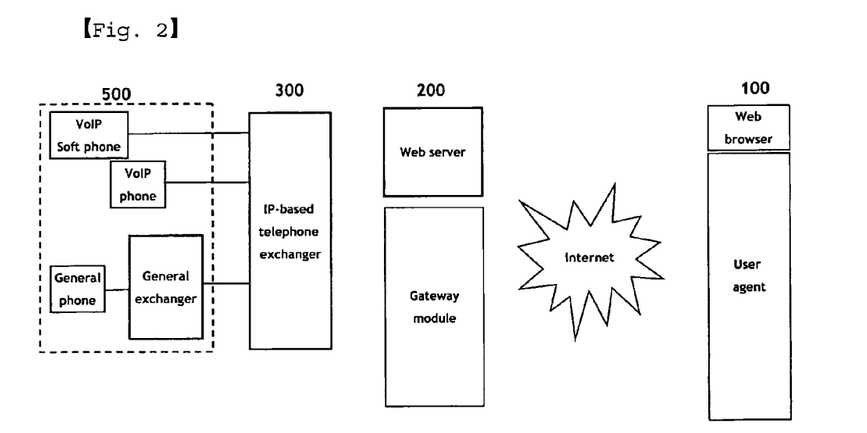
FIG. 2 is a diagram illustrating a configuration of an audio-video communication system according to another embodiment of the invention.

FIG. 2 is a diagram illustrating the configuration of an audio and video communication system according to an embodiment of the invention. The system configuration shown in FIG. 2 is different from the system configuration shown in FIG. 1, in that the service provider system 200 is connected to the IP-based telephone exchanger 300 via an internal network. In the system shown in FIG. 1, the service provider system 200 and the IP-based telephone exchanger 300 are connected to using a public IP address. However, in the system shown in FIG. 2, the service provider system 200 and the IP-based telephone exchanger 300 can be connected to each other via an internal network based on a private IP or a public IP, but most via the internal network based on the private IP. The internal network based on the private IP means a communication network used only in an independent company, in which several public IP addresses are used like a more number of private IP addresses.

Figure 3:
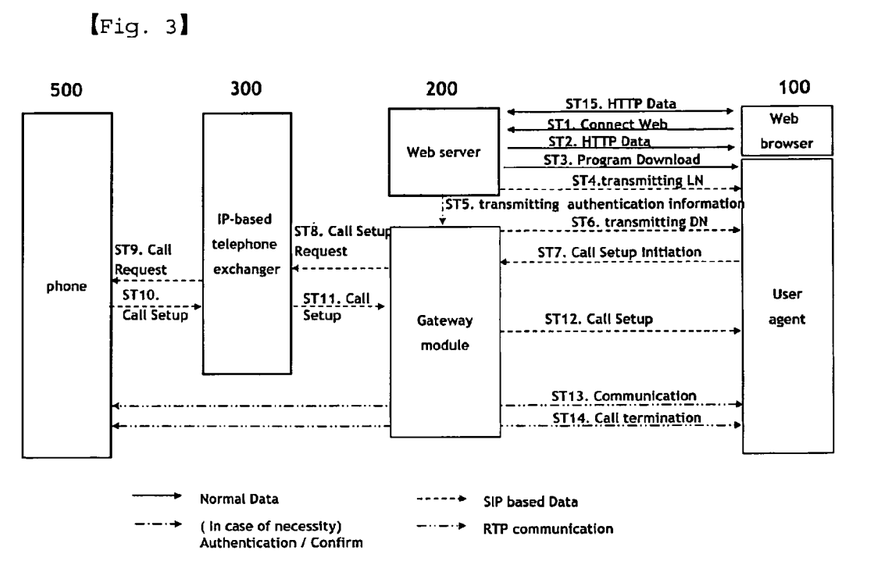
FIG. 3 is a flow diagram illustrating a flow of call processes in the audio and video communication system according to the embodiment of the invention.

FIG. 3 is a flow diagram illustrating a flow of a call process of the audio and video communication system according to an embodiment of the invention. The user system 100 accesses the web server via a web browser (ST1). The web server transmits a web page desired by the user to the user in accordance with a communication sequence of the hyper text transfer protocol (ST2). The web page given to the user includes the access information (for example, personnel division of Microsoft) and a telephone button (or icon).

A user intending to first enjoy the audio and video communication service according to the invention is caused to download an installation program for the user agent and installs the downloaded program in the user computer (ST3). When the user double clicks the telephone button displayed in the web page, the web server transmits an identifier allocated to the telephone button to the user agent (ST4).

The phone identifier allocated to the telephone button means a unique identifier for distinguishing it from other phones connected to the IP-based telephone exchanger with receiver phone access information, and is called LN (Location Number) herein.

At the same time, the web server transmits authentication information such as the IP address or the LN of the user system 100 to the gateway module (ST5). The gateway module authenticates the user agent using the authentication information, allocates a user identifier to the user agent, and transmits the user identifier (ST6).

The authentication information means information for authenticating that the user system 100 is a justified user when the user system 100 accesses the gateway module, and may be the IP address of the user system 100, the phone identifier allocated to the user system 100, or the user identifier allocated to the user system 100 in the subsequent procedure.

The user identifier is an identifier for distinguishing the user having clicked the phone button in the web page from the other users, is allocated by the gateway module or the web server. The user identifier serves to identify a caller communicating with the phone having the LN identifier. The user identifier is called DN (Dial Number) herein. The user identifier should be an identifier which can be recognized in the internal network in which the IP-based telephone exchanger is installed.

The user agent requests for a call setup initiation including the LN and the DN (ST7). The gateway module transmits necessary information received from the user agent to the IP-based telephone exchanger 300 along with a call setup request (ST8). The IP-based telephone exchanger 300 requests the phone 500 having the LN for a call request (ST9). The phone 500 transmits a response to the call setup to the IP-based telephone exchanger (ST10). The IP-based telephone exchanger 300 notifies the gateway module that the telephone call of the LN is set up (ST11). Thereafter, the gateway module transmits information of the call setup to the user agent, whereby the call setup is finished (St12).

In the audio communication using the Skype or the MSN messenger which is a VoIP phone in the past, the Skype server or the MSN messenger server should recognize the calling user by log-in before giving a call so as for the user to use the VoIP phone, and should know the IP address. However, in the invention, only when the user clicks the telephone button or icon, the intention to give a call to a specific phone among the internal phones 500 is seen and a processor is necessary which allocates the user identifier DN recognizable by the IP-based telephone exchanger 300 to the user agent. Accordingly, the user's log-in is not necessary for giving a call.

Thereafter, the gateway module can relay the audio communication between the phone having the LN identifier and the DN user (ST13) and can terminate the communication (ST14). After the termination of the communication, the user can continue the web surfing of transmitting and receiving HTTP data (ST15).

Figure 4:
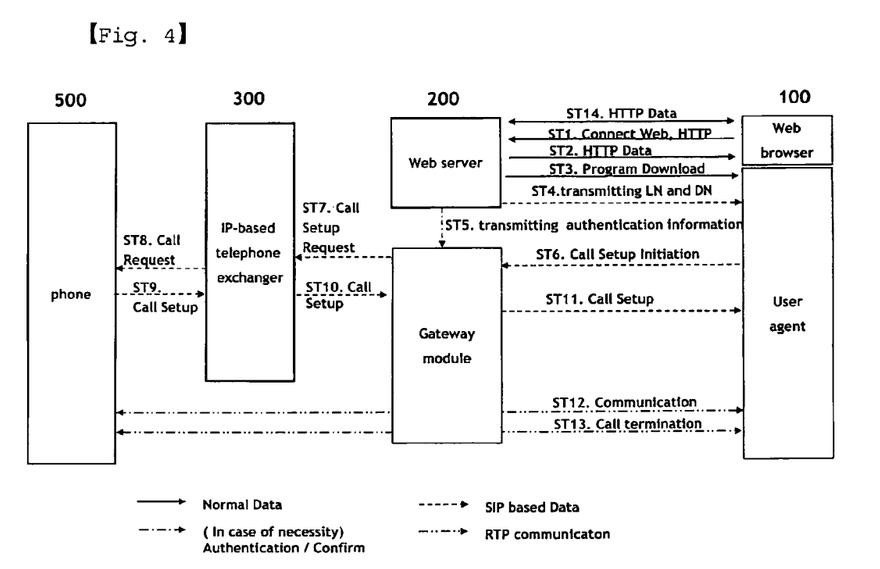
FIG. 4 is a flow diagram illustrating another flow of call processes in the audio and video communication system according to the embodiment of the invention.

FIG. 4 is a flow diagram illustrating a flow of a call process of the audio and video communication system according to another embodiment of the invention. The user system 100 accesses the web server via a web browser (ST1). The web server transmits a web page desired by the user to the user in accordance with a communication sequence of the hyper text transfer protocol (ST2). The web page given to the user includes the access information (for example, personnel division of Microsoft) and a telephone button (or icon).

A user intending to first enjoy the audio and video communication service according to the invention is caused to download an installation program for the user agent and installs the downloaded program in the user computer (ST3). The user having installed the user agent once need not perform the process of ST3. When the user double clicks the telephone button displayed in the web page, the web server allocates a DN to the user agent and transmits the phone identifier LN and the user identifier DN to the user agent (ST4). In the same step or the subsequent step, the web server transmits authentication information to the gateway module, and the gateway module waits for a call request from the user system 100 (ST5). In some cases, the process of ST5 may be skipped, the user agent may receive the LN of the phone and the DN as the temporary identification information to be used by the user agent from the web server, and the user agent may access the gateway module in a state where the gateway module does not receive the information from the web server.

The user agent transmits a call setup request including the LN and the DN to the gateway module along with a call setup initiation request (ST6). The gateway module authenticates the user using the authentication information such as the DN received from the user agent, and transmits the setup information to the IP-based telephone exchanger 300 to set up the communication between the LN and the DN (ST7). The IP-based telephone exchanger 300 transmits a call request to the phone 500 of the LN (ST8). The phone 500 notifies the IP-based telephone exchanger of the information on the call setup (ST9). The IP-based telephone exchanger 300 notifies the gateway module that the phone of the LN is prepared for the call (ST10). Thereafter, the gateway module notifies the user agent that the call setup is finished (ST11).

The gateway module can relay the audio communication between the phone having the LN identifier and the DN user (ST12) and can terminate the communication (ST13). After the termination of the communication, the user can continue the web surfing of transmitting and receiving HTTP data (ST14).

Figure 5:
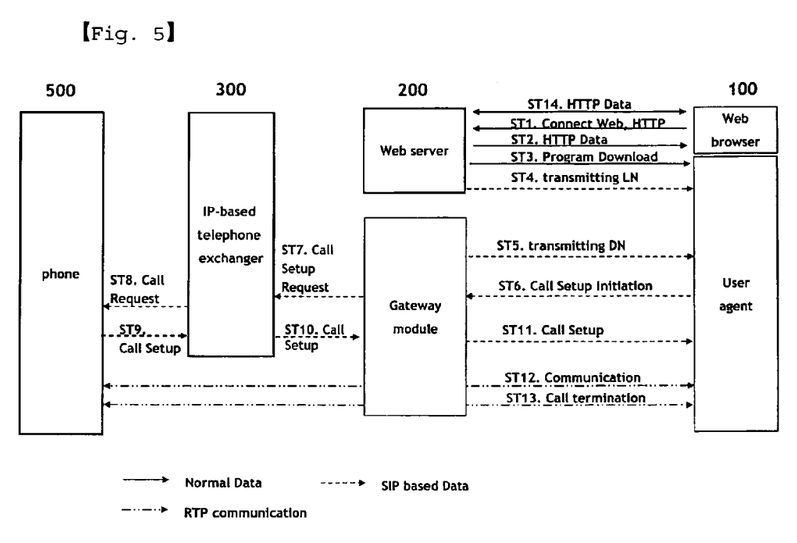
FIG. 5 is a flow diagram illustrating another flow of call processes in the audio and video communication system according to the embodiment of the invention.

FIG. 5 is a flow diagram illustrating a flow of a call process of the audio and video communication system according to another embodiment of the invention. The user system 100 accesses the web server via a web browser (ST1). The web server transmits a web page desired by the user to the user in accordance with a communication sequence of the hyper text transfer protocol (ST2). The web page given to the user includes the access information (for example, personnel division of Microsoft) and a telephone button (or icon).

A user intending to first enjoy the audio and video communication service according to the invention is caused to download an installation program for the user agent and installs the downloaded program in the user computer (ST3). The user having installed the user agent once need not perform the process of ST3. When the user double clicks the telephone button displayed in the web page, the web server transmits the phone identifier LN of the phone to the user agent (ST4). Subsequently, the user agent accesses the gateway module and the gateway module allocates and transmits a DN to the user agent (ST5). In some cases, the temporary DN may be specified by selecting one of plural DNs included in the gateway module, or the gateway module may request another system such as the IP-based telephone exchanger 300 for the allocation of the DN, may receive the allocated DN from another system such as the IP-based telephone exchanger 300, and may transmit the allocated DN to the user agent.

The user agent transmits a call setup initiation request including the LN and the DN (ST6). The gateway module transmits the necessary information such as the LN received from the user agent to the IP-based telephone exchanger 300 along with a call setup request (ST7). The IP-based telephone exchanger 300 transmits a call request to the phone 500 of the LN (ST8). The phone 500 notifies the IP-based telephone exchanger of the information on the call setup (ST9). The IP-based telephone exchanger 300 notifies the gateway module that the phone of the LN is prepared for the call (ST10). Thereafter, the gateway module notifies the user agent that the call setup is finished, whereby the call setup is terminated (ST11).

The gateway module can relay the audio communication between the phone having the LN identifier and the DN user (ST13) and can terminate the communication (ST14). After the termination of the communication, the user can continue the web surfing of transmitting and receiving HTTP data (ST15).

The embodiments shown in FIGS. 3 to 5 may be additionally modified in issuing the LN and the DN. For example, when the user clicks the telephone button or icon displayed in the web page, the web server may transmit a phone identifier LN to the gateway module, and the gateway module may issue a user identifier DN and may transmit the received phone identifier LN and the issued user identifier DN to the user agent when the user agent accesses the gateway module.

In another embodiment, when the user clicks the telephone button or icon displayed in the web page, the web server may issue and transmit a phone identifier LN and a user identifier DN to the gateway module, and the gateway module may transmit the phone identifier LN and the user identifier DN to the user agent when the user agent accesses the gateway module.

In another embodiment, when the user clicks the telephone button or icon displayed in the web page, the web server may issue a phone identifier LN and a user identifier DN, transmit the phone identifier LN to the user system, and transmit the user identifier DN to the gateway module. Then, the gateway module may transmit the user identifier DN to the user system when the user agent accesses the gateway module.

In another embodiment, when the user clicks the telephone button or icon displayed in the web page, the web server may issue a phone identifier LN and a user identifier DN, transmit the user identifier DN to the user system, and transmit the phone identifier LN to the gateway module. Then, the gateway module may transmit the phone identifier LN to the user system when the user agent accesses the gateway module.

In another embodiment, a user may directly input a user identifier DN, which can be recognized by the IP-based telephone exchanger, using the user agent without clicking a web page, and a communication may be made by the gateway module. In this case, the data communication between the user agent and the gateway module is possible by inputting the access information on the gateway module to the user agent in advance, and the user has to input the user identifier DN which can be recognized by the IP-based telephone exchanger.

It has been described above that the web server or the gateway module allocates the user identifier DN or the user agent specifies the user identifier DN and requests for a call. However, when the user gives a call to another phone connected to the same IP-based telephone exchanger 300, it is not necessary to allocate a new user identifier DN. For example, when a user having communicated with the personnel division of Microsoft hangs up and gives a call to a promotion division, it is not necessary to perform a procedure of allocating a new user identifier DN.

While specific embodiments of the invention have been described and shown above, it is obvious that the invention can be modified in various forms by those skilled in the art without departing from the technical spirit of the invention. The modified embodiments should not be understood separately from the spirit and scope of the invention and should be considered as belonging to the appended claims of the invention. Although the audio communication has been mainly described above, the invention can be easily applied to a video communication. In this case, the phone 500 means a television phone and a protocol suitable for a video should be used instead of the SIP protocol.

The invention claimed is:

1. A service provider system establishing an audio/video communication between a user system which is accessed for an audio/video communication in a state where a user identifier DN for identifying the user system from another user system for the purpose of the audio/video communication is not given to the user system and a system including an IP-based telephone exchanger taking charge of a telephone exchange between Internet phones and a plurality of phones connected to the IP-based telephone exchanger, the service provider system comprising:
   a web server providing the user system with a phone icon or button indicating a call receiver and transmitting a phone identifier LN for identifying the receiver allocated to the phone button when a user clicks the icon or button; and
   a gateway module performing a call setup in response to a data connection request for the audio/video communication from the user system, specifying the user identifier DN for identifying the user system from another user system, transmitting the phone identifier LN to the IP-based telephone exchanger, and relaying a communication between a phone connected to the IP-based telephone exchanger and the user system to progress the audio/video communication.

2. The service provider system according to claim 1, wherein the user identifier DN is an identifier which can be recognized by the IP-based telephone exchanger to identify a caller from another caller.

3. The service provider system according to claim 1, wherein the specification of the user identifier DN in the gateway module is carried out after the user system accesses the gateway module for the audio/video communication.

4. The service provider system according to claim 1, wherein the web server transmits the authentication information of the user system to the gateway module, and the gateway module authenticates the user system referring to the authentication information.

5. The service provider system according to claim 1, wherein the web server transmits the phone identifier (LN) to the user system.

6. The service provider system according to claim 1, wherein the web server transmits the phone identifier LN to the gateway module, and the gateway module transmits the phone identifier LN and the user identifier DN to the user system.

7. The service provider system according to claim 1, wherein the user system includes a user agent having a downloadable module for accessing the gateway module to initialize the call setup.

8. The service provider system according to claim 7, wherein the web server transmits access information of the gateway module to the user agent when the user clicks the phone icon or button.

9. The service provider system according to claim 7, wherein the user system accesses the gateway module using the access information of the gateway module stored in the user agent when the user clicks the phone icon or button.

10. A service provider system establishing an audio/video communication between a user system which is accessed for an audio/video communication in a state where a user identifier DN for identifying the user system from another user system for the purpose of the audio/video communication is not given to the user system and a system including an IP-based telephone exchanger taking charge of a telephone exchange between Internet phones and a plurality of phones connected to the IP-based telephone exchanger, the service provider system comprising:
   a web server providing the user system with a phone icon or button indicating a call receiver and transmitting a phone identifier LN for identifying the receiver allocated to the phone button and a user identifier DN for identifying the user system from another user system when a user clicks the icon or button; and a gateway module receiving an audio/video-communication call setup request including the phone identifier and the user identifier from the user system, transmitting the phone identifier LN to the IP-based telephone exchanger, and relaying a communication between a phone connected to the IP-based telephone exchanger and the user system to progress the audio/video communication.

11. The service provider system according to claim 10, wherein the user identifier is a number being recognized by the IP-based telephone exchanger.

12. The service provider system according to claim 10, wherein the web server transmits the user identifier and the phone identifier to the gateway module, and the gateway module transmits the phone identifier LN and the user identifier DN to the user system.

13. The service provider system according to claim 10, wherein the web server transmits the user identifier and the phone identifier to the user system.

14. The service provider system according to claim 10, wherein the web server transmits the phone identifier LN to the gateway module, the gateway module transmits the phone identifier LN to the user system, and the web server transmits the user identifier DN to the user system.

15. The service provider system according to claim 10, wherein the web server transmits the user identifier DN to the gateway module, the gateway module transmits the user identifier DN to the user system, and the web server transmits the phone identifier LN to the user system.

16. The service provider system according to claim 10, wherein the user system includes a user agent having a downloadable module for accessing the gateway module to initialize the call setup.

17. The service provider system according to claim 16, wherein the web server transmits access information of the gateway module to the user agent when the user clicks the phone icon or button.

18. The service provider system according to claim 16, wherein the user system accesses the gateway module using the access information of the gateway module stored in the user agent when the user clicks the phone icon or button.

19. A service provider system establishing an audio/video communication between a user system which is accessed for an audio/video communication in a state where a user identifier DN for identifying the user system from another user system for the purpose of the audio/video communication is not given to the user system and a system including an IP-based telephone exchanger taking charge of a telephone exchange between Internet phones and a plurality of phones connected to the IP-based telephone exchanger, wherein the service providing system provides the user system with a phone icon or button indicating a call receiver and transmits a phone identifier LN for identifying the receiver allocated to the phone button when a user clicks the icon or button, and wherein the service providing system specifies a user identifier DN for identifying the user system from another user system, performs a call setup, transmits the phone identifier LN to the IP-based telephone exchanger, and relays a communication between a phone connected to the IP-based telephone exchanger and the user system to progress the audio/video communication.

20. The service provider system according to claim 19, wherein the user identifier DN is an identifier which can be recognized by the IP-based telephone exchanger to identify a caller from another caller.

\* \* \* \* \*